Patented Oct. 18, 1949

2,485,259

UNITED STATES PATENT OFFICE 2,485,259

ACOUSTICAL PLASTER AND METHOD OF MAKING

Willard L. Chrisler, Kenmore, N. Y., assignor to National Gypsum Company, Buffalo, N. Y.

No Drawing. Application November 29, 1946, Serial No. 713,081

2 Claims. (Cl. 106—114)

The present invention relates to acoustical plasters and more particularly to acoustical plasters possessing improved water retention during working under the trowel and characterized by an increased time of working.

Heretofore the acoustical properties of rooms and auditoriums have been improved by treating the walls and ceilings thereof with porous sound absorbing materials. Such materials are either of an inorganic nature or porous, fibrous materials. Such acoustical correction agents were applied to the walls or ceilings or both of the space, the acoustical properties of which was to be corrected, either by attaching panels of the acoustical correction agent thereto or by applying such agent as a continuous film or cover coat in plastic form which subsequently set or hardened.

Where the acoustical correction agent was attached as a panel it was normally either bonded to the walls and ceilings by a cement or bonding agent or by means of intricate systems of clips and hangers. Acoustical plasters, as used heretofore, comprised a porous aggregate and a cementitious bonding agent capable of being rendered plastic by the addition of water such as Portland cement or calcined gypsum or lime.

Since acoustical plasters are normally applied over a base coat of plaster such acoustical correction agents were normally applied heretofore by plasterers accustomed to work with ordinary wall plasters. However, due to the difference in nature between ordinary wall plasters and acoustical plasters, difficulty has been encountered in applying the latter properly to a wall or ceiling. This difficulty is traceable to two main differences between plastic mixes of wall plasters and plastic mixes of acoustical plasters. In the first place, due to the presence of the extremely porous aggregate, acoustical plasters lose water by absorption into the dry base to which they are applied and also by evaporation into the air, to a much greater extent than wall plasters and, secondly, acoustical plasters acquire an initial set much more rapidly than wall plasters and, hence, are extremely difficult to float and darby to the proper level and texture.

Due to the porous nature of the aggregate the bonding agent in the acoustical plaster may tend to dry out by reason of water loss prior to set and form a chalky and weak bond resulting in a friable coat of plaster with insufficient inherent strength.

It is an object of the present invention to provide an improved acoustical plaster wherein the ease of application of the plastic mix thereof is far superior to acoustical plasters heretofore available.

It is another object of the invention to decrease the loss of water from plastic mixes of acoustical plaster to the base to which it is applied and by evaporation to the air.

It is also an object of the invention to increase the length of the working period of the plastic mix of acoustical plaster under the trowel.

Other objects of the invention are to increase the strength of the set acoustical plaster and to increase the plasticity of the mix of the acoustical plaster and water.

In accordance with the present invention an improved dry acoustical plaster mix is prepared from a porous aggregate, an inorganic water setting cementitious material and a small amount of a natural gum which aids in retaining the gaging water in the plastic mix when applied and in increasing the working time of such mix. As the efficiency of the acoustical plaster depends upon the number and size of intercommunicating pores whereby sound waves striking thereagainst are absorbed and their energy dissipated within the body of the plaster rather than reflected therefrom, the aggregate comprises crushed, highly porous, inorganic materials such as pumice, crushed slag, and the like to which may be added asbestos fibres as well as organic fibrous materials such as wood fibres, waste paper pulp, and the like. In general, the amount of aggregate is considerably in excess of the amount of inorganic cementitious bonding agent. The bonding agent is generally plaster of Paris although Portland cement, or other cementitious material capable of setting in the presence of water may be employed.

The acoustical plaster may also contain in addition to the principal constituents, namely, the aggregate and the water-setting bonding agent or cement, a number of other materials which improve various characteristics associated with the acoustical properties or the application of the plaster to the wall. Thus, finely-divided asbestos fibres tend to improve the plasticity and slip of the plastic mix obtained by addition of water to the plaster-aggregate combination. Cellulose or wood fibres tend to improve the bulking properties of the plaster since they aid in water-absorption and help in providing cohesion of the wet mix and thus prevent settling of the aggregate and non-uniformity within the mix.

It is also customary to include within the mix agents which control the setting time of the cementitious bond when in contact with water. Such agents as are added normally tend to retard the setting time and thus permit better working of the mix under the trowel. Such substances are well known in the trade and the usual commercial retarders for plaster comprise lime or other alkali digested protein substances. Additionally gas entraining agents which tend to increase the bulk of the wet mix and which impart, in part at least, a portion of the cellular structure of the finished plaster so necessary for effective sound absorption, may be included.

By adding natural gums to the acoustical plaster mix in accordance with the present invention, such as locust bean gum or gum ghatti, in small amount on the order of 0.1% to 0.5% of the total weight of the dry acoustical plaster, the time available in which a water mix of the plaster may be troweled is greatly increased and, in addition, the loss of water to the plaster supporting wall and by evaporation to the air is also greatly diminished. Acoustical plasters made in accordance with the present invention and in which, therefore, a small amount of gum ghatti or locust bean gum has been incorporated provides from three to four times the usual working time of the same acoustical plaster without the inclusion of these natural gums.

As the water retention and working time of the plaster have been improved, the acoustical plaster, after application and set, possesses greater strength since any tendency to chalk on the exposed edges due to rapid loss of water has been greatly diminished.

Strange as it may seem, benefits of this character are not imparted when employing gum tragacanth, algin, or karaya gum and other related natural gums. Acoustical plaster mixes to which such natural gums have been added tend to increase the water-carrying capacity slightly but do not appreciably improve the water retention of the wet mix when applied and worked over a dry base. Of all the natural gums only gum ghatti and locust bean gum appear to possess the desired property of both increasing water-carrying capacity to a considerable degree and of increasing the time of working of the mix under the trowel whereby the mix may be floated or darbied to the desired level and texture by the plasterer.

The following example is given merely by way of illustration and is not to be deemed limitative of the invention since it will be understood that the amounts and relation of aggregate and bonding agent may vary over a considerable range, the formulation given below being intended to be merely a typical formulation of a dry acoustical plaster mix.

| Material: | Parts by weight |
|---|---|
| Crushed graded pumice | 480.00 |
| Plaster of Paris | 225.00 |
| Asbestos fibre | 60.00 |
| Wood fibre | 18.00 |
| Soap (or other gas entraining material) | 0.25 |
| Commercial retarder | 1.25 |
| Locust bean gum (or gum ghatti) | 1.25 |

The dry acoustical plaster of the formulation given immediately above may be gaged with water in the usual amount to produce a wet mix of the proper consistency for troweling and will remain plastic and workable for about 3 minutes as contrasted with the same formulation without the presence of the gum, which is workable for only ¾ minute. The amount of gum used should be at least 0.1% by weight of the dry mix in order to obtain the desired result and may be present up to about 0.5%; amounts greater than 0.5% do not appear to improve either the water retention or time of working and merely serve to increase the expense of manufacture.

What is claimed is:

1. The method of increasing the working range of an acoustical plaster containing a porous aggregate and a water-setting calcined gypsum which comprises adding thereto at least about 0.1% of a gum selected from the group of natural gums consisting of locust bean and ghatti based on the weight of the dry mix.

2. An acoustical plaster comprising a water-setting calcined gypsum, porous aggregate and at least about 0.1% of a gum selected from the group of natural gums consisting of locust bean and ghatti based on the weight of the dry mix.

WILLARD L. CHRISLER.

REFERENCES CITED

The following references are of record in the file of this patent:

UNITED STATES PATENTS

| Number | Name | Date |
|---|---|---|
| 1,544,215 | Caldwell | June 30, 1925 |
| 1,901,057 | Roos | Mar. 14, 1933 |